US009798721B2

(12) United States Patent
Alhamed et al.

(10) Patent No.: US 9,798,721 B2
(45) Date of Patent: Oct. 24, 2017

(54) INNOVATIVE METHOD FOR TEXT ENCODATION IN QUICK RESPONSE CODE

(71) Applicant: King Abdulaziz City for Science and Technology, Riyadh (SA)

(72) Inventors: Felwah Alhamed, Riyadh (SA); Sara Aldoweesh, Riyadh (SA); Amr Alasaad, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 13 days.

(21) Appl. No.: 14/713,282

(22) Filed: May 15, 2015

(65) Prior Publication Data

US 2016/0335255 A1 Nov. 17, 2016

(51) Int. Cl.
*G06F 17/28* (2006.01)
*G06F 17/22* (2006.01)

(52) U.S. Cl.
CPC ...... *G06F 17/2863* (2013.01); *G06F 17/2223* (2013.01); *G06F 17/2276* (2013.01)

(58) Field of Classification Search
CPC .. G06F 17/20; G06F 17/2863; G06F 17/2223; G06F 17/2276
USPC .......................................................... 704/9
See application file for complete search history.

(56) References Cited

U.S. PATENT DOCUMENTS

| 6,024,289 A | 2/2000 | Ackley |
| 8,670,976 B2 | 3/2014 | Al-Omari et al. |
| 8,874,430 B2 | 10/2014 | Al-Omari et al. |
| 9,122,655 B2 * | 9/2015 | Schultz ................. G06F 17/212 |
| 2005/0195171 A1 * | 9/2005 | Aoki ..................... G06F 3/0237 345/172 |
| 2009/0171654 A1 | 7/2009 | Spain |
| 2012/0091203 A1 * | 4/2012 | Al-Omari ............... G06K 7/14 235/435 |

(Continued)

OTHER PUBLICATIONS

Kamil et al.,"Space Saving Algorithm for Arabic Characters in QR Code",Journal of Next Generation Information Technology(JNIT),vol. 4, No. 7, Sep. 2013, 8 pp.

*Primary Examiner* — Houshang Safaipour
*Assistant Examiner* — Bharathumar S Shah
(74) *Attorney, Agent, or Firm* — Andrew M. Calderon; Roberts Mlotkowski Safran Cole & Calderon, P.C.

(57) ABSTRACT

An approach includes a method implemented in a computer infrastructure having computer executable code tangibly embodied in a computer readable storage medium having programming instructions. The approach further includes the programming instructions configured to receive a bilingual text which comprises a first set of characters in a Latin-based language and a second set of characters in a non Latin-based language. The approach further includes the programming instructions configured to convert the second set of characters in the non Latin-based language in the bilingual text to a third set of characters in the Latin-based language based on a lookup table. The approach further includes the programming instructions configured to add a prefix character and a postfix character to each converted word in the third set of characters. The approach further includes the programming instructions configured to output an encoded representation of the bilingual text.

20 Claims, 7 Drawing Sheets

(56) References Cited

U.S. PATENT DOCUMENTS

2014/0124572 A1* 5/2014 Khorsheed .......... G06F 17/2223
235/375

* cited by examiner

| Arabic Letter | Matching English Letter | Arabic Letter | Matching English Letter | Arabic Letter | Matching English Letter |
|---|---|---|---|---|---|
| أ | A | ز | P | م | 5 |
| ؤ | B | س | Q | ن | 6 |
| إ | C | ش | R | ه | 7 |
| ئ | D | ص | S | و | 8 |
| ا | E | ض | T | ى | 9 |
| ب | F | ط | U | ي | 0 |
| ة | G | ظ | V | ْ | a |
| ت | H | ع | W | ّ | b |
| ث | I | غ | X | ِ | c |
| ج | J | ك | Y | َ | d |
| ح | K | ء | Z | ُ | e |
| خ | L | ف | 1 | ٍ | f |
| د | M | ق | 2 | ً | g |
| ذ | N | ا | 3 | ٌ | h |
| ر | O | ل | 4 | | |

FIG. 3

* Note that the space character is considered as a Latin-based character

INNOVATIVE METHOD FOR TEXT ENCODATION IN QUICK RESPONSE CODE

FIELD OF THE INVENTION

The invention relates to a method for text encoding in a quick response code and, more particularly, to a method and apparatus of bilingual text encoding in a quick response code.

BACKGROUND OF THE INVENTION

Quick response (QR) codes are widely used for storing text and data. When using a QR standard encoding scheme, the storage capacity needed to encode a Latin-based character (e.g., English character) differs from the storage capacity needed to encode a non Latin-based character (e.g., Arabic). For example, English text encodation in the QR standard requires 1 byte for every English character, whereas an Arabic character requires at least two bytes to be encoded using bytemode with UTF-8 encoding. Also, a Kanji/Kana character requires 13 bits. Thus, a QR symbol is not able to encode as much information in a non Latin-based language (e.g., Arabic text) as with a Latin-based language (e.g., English text).

SUMMARY OF THE INVENTION

In a first aspect of the invention, a method is implemented in a computer infrastructure having computer executable code tangibly embodied in a computer readable storage medium having programming instructions. The programming instructions are further configured to receive a bilingual text which comprises a first set of characters in a Latin-based language and a second set of characters in a non Latin-based language. The programming instructions are further configured to convert the second set of characters in the non Latin-based language in the bilingual text to a third set of characters in the Latin-based language based on a lookup table. The programming instructions are further configured to add a prefix character and a postfix character to each converted word in the third set of characters. The programming instructions are further configured to output an encoded representation of the bilingual text which comprises the converted third set of characters in the Latin-based language, the added prefix character to each converted word in the third set of characters, the postfix character to each converted word in the third set of characters, and the first set of characters in the Latin-based language.

In another aspect of the invention, there is a computer program product comprising a computer readable storage medium having program instructions embodied therein. The computer readable storage medium is not a transitory signal per se. The program instructions are readable by a computing device to cause the computing device to perform a method including receiving an encoded representation of a bilingual text which comprises a first set of characters in a Latin-based language and a second set of characters in a non Latin-based language. The program instructions further include converting the encoded representation of the bilingual text to the first set of characters in the Latin-based language and the second set of characters in the non Latin-based language based on a lookup table. The program instructions further include removing prefix characters and postfix characters after the conversion of the encoded representation. The program instructions further include outputting the bilingual text which comprises the first set of characters in the Latin-based language and the second set of characters in the non Latin-based language.

In yet another aspect of the invention, a computer system for providing encoding of a multi-lingual text includes a CPU, a computer readable memory, and a computer readable storage media. The system further includes first program instructions to receive the multi-lingual text which comprises a first set of characters in a Latin-based language and a second set of characters in a non Latin-based language. The system further includes second program instructions to iterate through each letter of the multi-lingual text and perform further program instructions including third program instructions to determine that a current letter of the multi-lingual text is the Latin-based language and a previous letter of the multi-lingual text is the non Latin-based language, and then add a postfix character to the previous letter of the multi-lingual text in response to the determination, which indicates an end of a non Latin-based language string, fourth program instructions to determine that the current letter of the multi-lingual text is the non-Latin based language and is a first letter in a word, and then add a prefix character in front of the current letter of the multi-lingual text in response to the determination to indicate a start of the non Latin-based language string, and fifth program instructions to convert the current character of the multi-lingual text to a corresponding Latin-based character based on a lookup table. The first, second, third, fourth and fifth program instructions are stored on the computer readable storage media for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 3 shows a lookup table for every Arabic character and its corresponding Latin-based text character in accordance with aspects of the present invention.

DETAILED DESCRIPTION OF THE INVENTION

Figure 1:
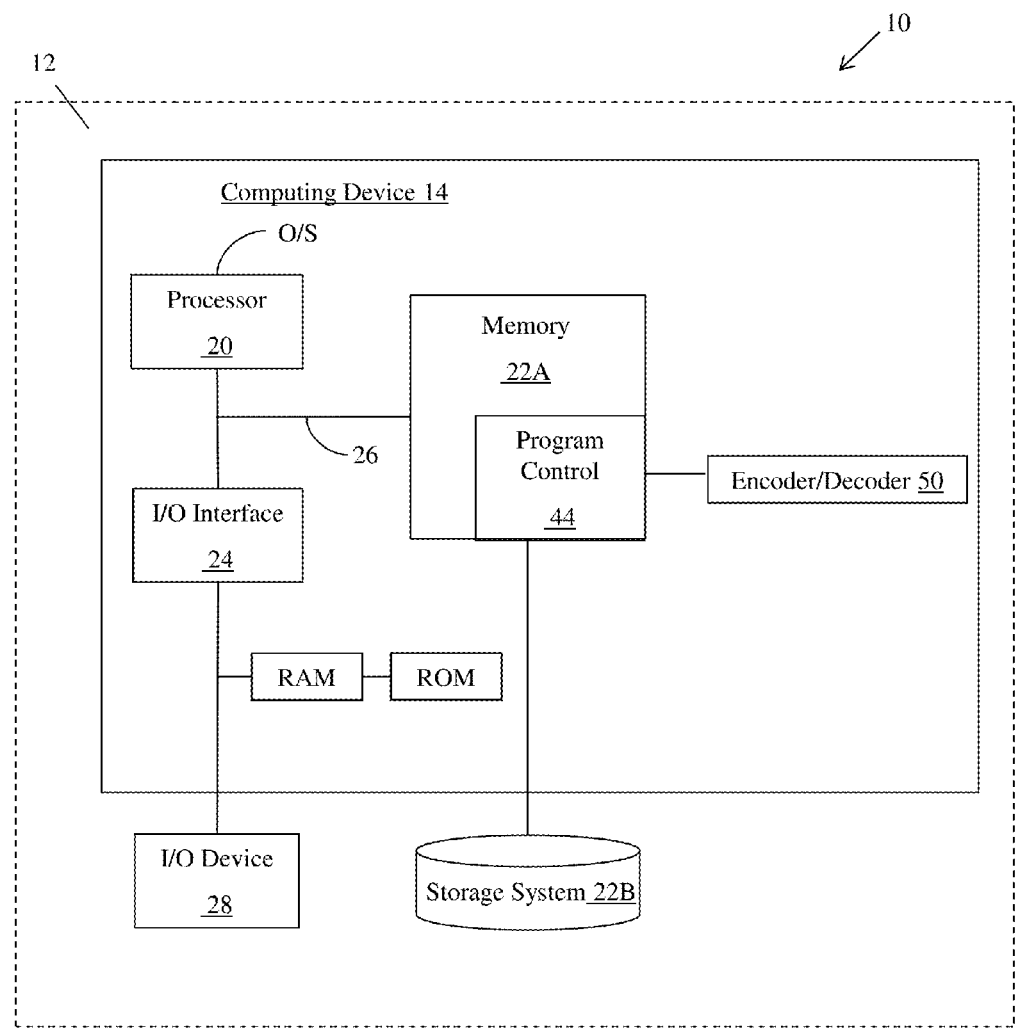
FIG. 1 shows an illustrative environment for implementing the steps in accordance with aspects of the present invention.

The invention relates to a method for text encoding in a quick response code and, more particularly, to a method and apparatus of bilingual text encoding in a quick response code. More specifically, embodiments of the invention relate to a method and apparatus for improving performance of bilingual text encoding in a quick response code.

As should be understood by those of skill in the art, storage capacity needed to encode a Latin-based character (e.g., English) differs from a non Latin-based character (e.g., Arabic). For example, English text encoding in a QR standard requires 1 byte for every English character, Arabic text encodation in the QR standard requires at least two bytes for every Arabic character, and Kanji/Kana encodation in the QR standard requires 13 bits for every Kanji/Kana character. Thus, a size of information which a QR symbol can accommodate for the Arabic text in any given symbol size and image resolution is smaller than a size of information which a QR symbol can accommodate for the corresponding English text.

In embodiments, a method and system can be used to significantly improve the encodation capacity of QR for texts in languages other than Latin-based languages (e.g., Arabic). Although embodiments are mainly described with reference to Arabic and English text, embodiments are not limited to these examples. For example, the method and system of the embodiments can be applied to any pair which includes a Latin-based language (e.g., English, French, Spanish, German, Italian, etc.) and a non Latin-based language (e.g., Arabic, Urdu, Farsi, etc.).

In more specific embodiments, a bilingual text is passed through an encoder. As an example, the bilingual text may include both English and Arabic text. The encoder iterates through every character of the bilingual text. If a character of the bilingual text is Arabic, then the Arabic character is converted into an English character using a lookup table. Further, the encoder adds a first padding character (e.g., prefix character, ~) if the first letter in a word is Arabic and a second padding character (e.g., postfix character, =) if the last letter in the word is Arabic. Then, the encoder outputs the combined English text to a QR encoder which generates a QR code using the combined English text.

In more specific embodiments, the generated QR code may be decoded through a QR decoder which generates the combined English text. Then, the combined English text is passed through a bilingual text decoder. The decoder iterates through every character of the combined English text. If a character of the combined English text includes the prefix character (e.g., ~), the decoder replaces the character which comes after the prefix character (e.g., ~) with the corresponding Arabic character according to the lookup table. The decoder repeats this process until a character of the combined English text includes the postfix character (e.g., =), which indicates the end of the Arabic text/string. Further, in the bilingual text decoder, any word which does not start with the prefix character (e.g., ~) is an English text and is left unchanged. Then, after every character of the combined English text is passed through the bilingual text decoder, the bilingual text is output.

Figure 2:
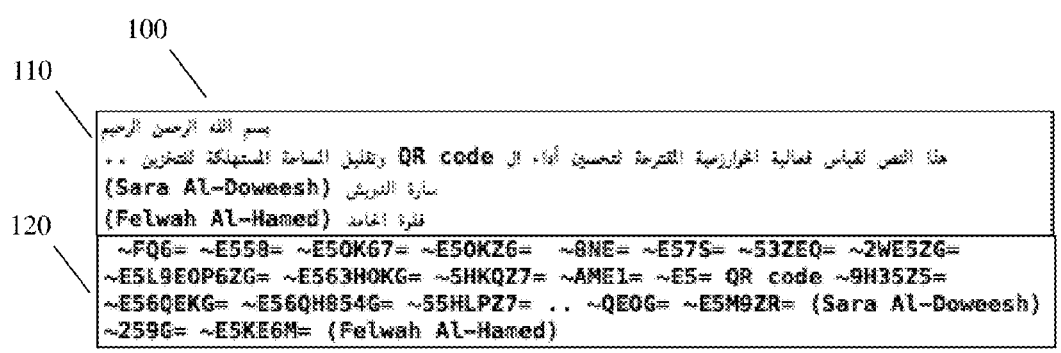
FIG. 2 shows a representation of bilingual text and encoded representation in accordance with aspects of the present invention.

In embodiments, one of ordinary skill in the art would understand that when a prefix character is added, the prefix character may be added in front of the current character (see, e.g., FIG. 2). Further, one of ordinary skill in the art would understand that when a postfix character is added, the postfix character may be added right after the current character (see, e.g., FIG. 2). Further, one of ordinary skill in the art would understand that although the embodiments described herein are related to a bilingual text, the embodiments may also be applicable to a multilingual text which may comprise two or more languages, including at least one of a Latin-based language and a non Latin-based language.

In known methods and systems, a size of a QR symbol needs to be selected carefully to allow a reader (e.g., a scanner) to decode the QR symbol easily and without errors. For example, small size code may be required when encoding a text and printing the QR code on a document or small items. In this scenario, a QR code with low image resolution (i.e., high module/version) may be used to account for more information since the reader is close in distance to the QR code. Alternatively, for example, a large QR symbol size may be required for a street advertisement. In this scenario, a QR code with high image resolution (i.e., low module/version) must be used since the reader is far away in distance to the QR code. Thus, low QR storage capacity will occur since the QR symbol image resolution compensates for the amount of data stored in the code. In other words, there is a limit to the amount of stored data for any given QR symbol size or QR code image resolution (QR version/module). For example, if one wants to use a fixed QR symbol size, while keeping the reader distance fixed, a maximum of X bytes of information can be stored to ensure efficient and correct readability for a QR reader.

In embodiments disclosed herein, a higher QR storage capacity is enabled by converting bilingual text to English characters to enhance the performance of encoding Arabic text in QR code. Further, enhancing performance of encoding Arabic text in QR code occurs by decreasing a number of binary bits needed to store any Arabic character. Improving the efficiency of QR coding for Arabic text in the embodiments can improve the efficiency of labeling of, for example, government documents in Arabian governmental agencies without disrupting quality, allow for fast content verification and documentation for Arabic text, and improve filing online template applications which require large amount of information to be completed in Arabic text. However, applications of the methods and systems of the embodiments are not limited to the applications described above, and other implementations are thus contemplated herein by the present invention.

System Environment

Although the systems and methods described hereafter with regard to exemplary methods, and/or computer program products, it should be understood that other implementations are also contemplated by the present invention as described herein. For example, other devices, systems, appliances, and/or computer program products according to embodiments of the invention will be or become apparent to one of ordinary skill in the art upon review of the following drawings and detailed description. It is intended that all such additional other devices, systems, appliances, processes, and/or computer program products be included within this description and within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, any non-transitory storage medium, device, or system including an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device receives computer readable program instructions from the network and forwards the computer readable program instructions for storage in a computer readable storage medium within the respective computing/processing device.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

FIG. 1 shows an illustrative environment 10 for managing the processes in accordance with the invention. The environment 10 includes a server or other computing system 12 that can perform the processes described herein. The server 12 includes a computing device 14 which can be resident on a network infrastructure or computing device. The computing device 14 includes a processor 20, memory 22A, an I/O interface 24, and a bus 26. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in computing device 14.

By way of example, encoder/decoder 50 may be configured to encode bilingual text to generate a combined English text and decode the combined English text to generate the bilingual text. The encoder/decoder 50 may iterate through every character of the bilingual text. If a character of the bilingual text is Arabic, then the Arabic character is converted into an English character using a lookup table. Further, the encoder/decoder 50 adds a first padding character (e.g., prefix character, ~) if the first letter in a word is Arabic and a second padding character (e.g., postfix character, =) if the last letter in the word is Arabic. Then, the encoder/decoder 50 outputs the combined English text. The encoder/decoder 50 iterates through every character of the combined English text. If a character of the combined English text includes the prefix character (e.g., ~), the encoder/decoder 50 replaces the character which comes after the prefix character (e.g., ~) with the corresponding Arabic character according to the lookup table. The encoder/decoder 50 repeats this process until a character of the combined English text includes the postfix character (e.g., =), which indicates the end of the Arabic text/string. Further, any word which does not start with the prefix character (e.g., ~) is assumed to be an English text by the encoder/decoder 50, and is left unchanged. Then, after every character of the combined English text is passed through the encoder/decoder 50, the bilingual text is output.

FIG. 2 shows a representation of bilingual text and encoded representation in accordance with aspects of the present invention. More specifically, FIG. 2 depicts the bilingual text and encoded representation 100 which comprises a bilingual text 110 and the encoded representation 120. In FIG. 2, as an example, the bilingual text 110 includes Arabic and English. However, embodiments are not limited, and the bilingual text 110 may comprise any pair of a non-Latin based language and a Latin-based language.

As shown in FIG. 2, an encoder may iterate through the bilingual text 110 and encode each character of the bilingual text 110. In FIG. 2, the encoder may add a prefix character (e.g., ~) if a first letter of a word in the bilingual text 110 is Arabic. Further, in FIG. 2, the encoder may add a postfix character (e.g., =) if a last letter of a word in the bilingual text 110 is Arabic. The encoder may convert an Arabic letter to its corresponding English letter based on a lookup table.

As shown in FIG. 2, the encoder does not change or convert any English letter of the bilingual text 110 (i.e., leaves the English letters of the bilingual text 110 unchanged). After the encoder encodes the bilingual text, the output is shown in FIG. 2 as the encoded representation 120. The encoded representation 120 makes it more efficient to encode (i.e., embed) Arabic text in QR code because it decreases the number of binary bits needed to store any Arabic character as compared to using the standard QR encoding scheme and this consequently, increases the number of Arabic characters that can be embedded in a QR code.

FIG. 3 shows an exemplary non-limiting illustration of a lookup table in accordance with aspects of the present invention. In FIG. 3, although Arabic letters are shown, embodiments are not limited to this implementation. For example, any non Latin-based language may be used to map the non Latin-based language to a Latin-based language. However, the lookup table needs to be defined accordingly. In FIG. 3, in a lookup table 200, the Arabic letters are mapped to matching English letters. As the number of Arabic letters is greater than the number of English letters, FIG. 3 shows that uppercase English letters, lowercase English numbers, and English numerals are used to match all of the Arabic letters in the lookup table 200. In FIG. 3, the lookup table 200 is used by the encoder and decoder to convert the Arabic latter to a matching English letter and vice-versa to improve the efficiency of QR coding for Arabic text.

Figure 4:
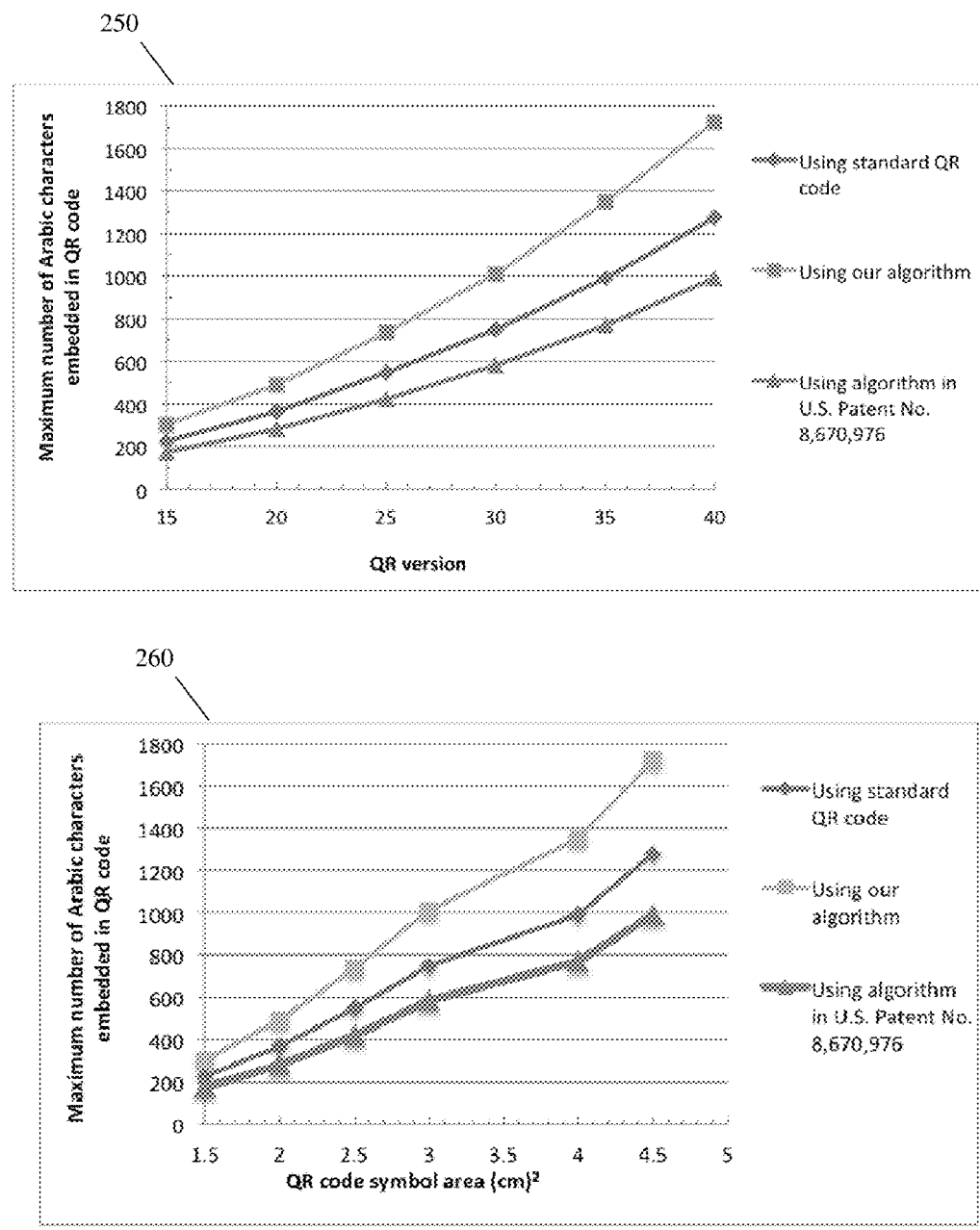
FIG. 4 shows graphical representations of a maximum number of Arabic characters for varied QR versions and QR symbol size in accordance with aspects of the present invention.

FIG. 4 shows graphical representations of the maximum number of Arabic characters for varied QR versions and QR size in accordance with aspects of the present invention. In FIG. 4, a first graph 250 shows the maximum possible number of Arabic characters plotted against different QR versions. In the first graph 250, the method (i.e., the algorithm) is able to comprise (i.e., embed) more number of Arabic characters for each QR version as compared to cases when not using the method described herein. Further, the method (e.g., as shown in first graph 250) is able to process a greater number of Arabic characters in order to generate a specific QR code version than the algorithm in U.S. Pat. No. 8,670,976.

In FIG. 4, a second graph 260 shows an Arabic character count plotted against a QR code symbol area. In the second graph 260, the method (i.e., the algorithm) is able to comprise (i.e., embed) a greater number of Arabic characters in a QR code symbol size as compared to cases when not using the method described herein. Further, the method in the embodiments (e.g., as shown in second graph 260) is able to process a greater number of Arabic characters in order to generate a specific QR code symbol size than the algorithm in U.S. Pat. No. 8,670,976.

Flow Diagram

Figure 5:
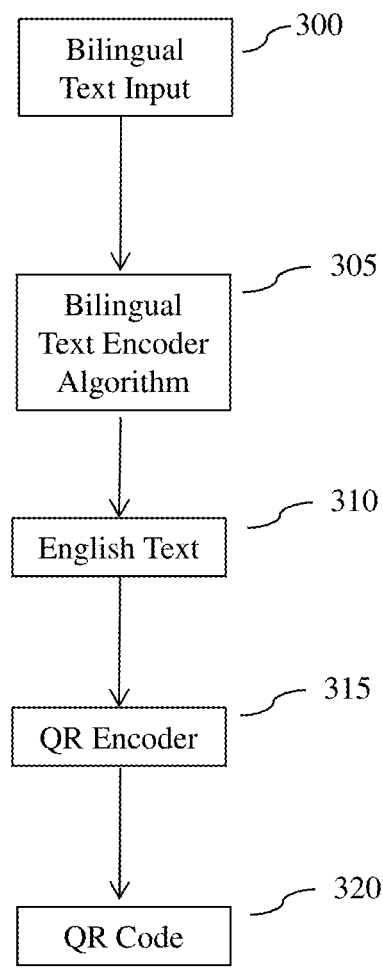
FIG. 5 shows a flow diagram of bilingual text encoding in accordance with aspects of the present invention.
Figure 6:
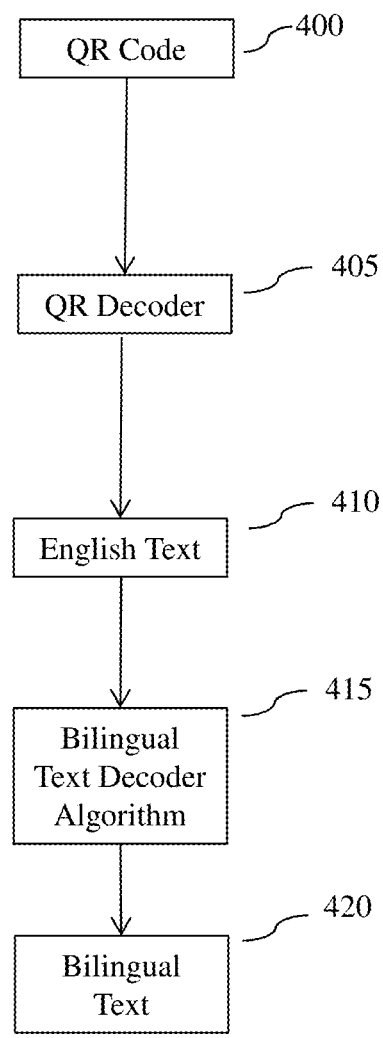
FIG. 6 shows a flow diagram of bilingual text decoding in accordance with aspects of the present invention.
Figure 7:
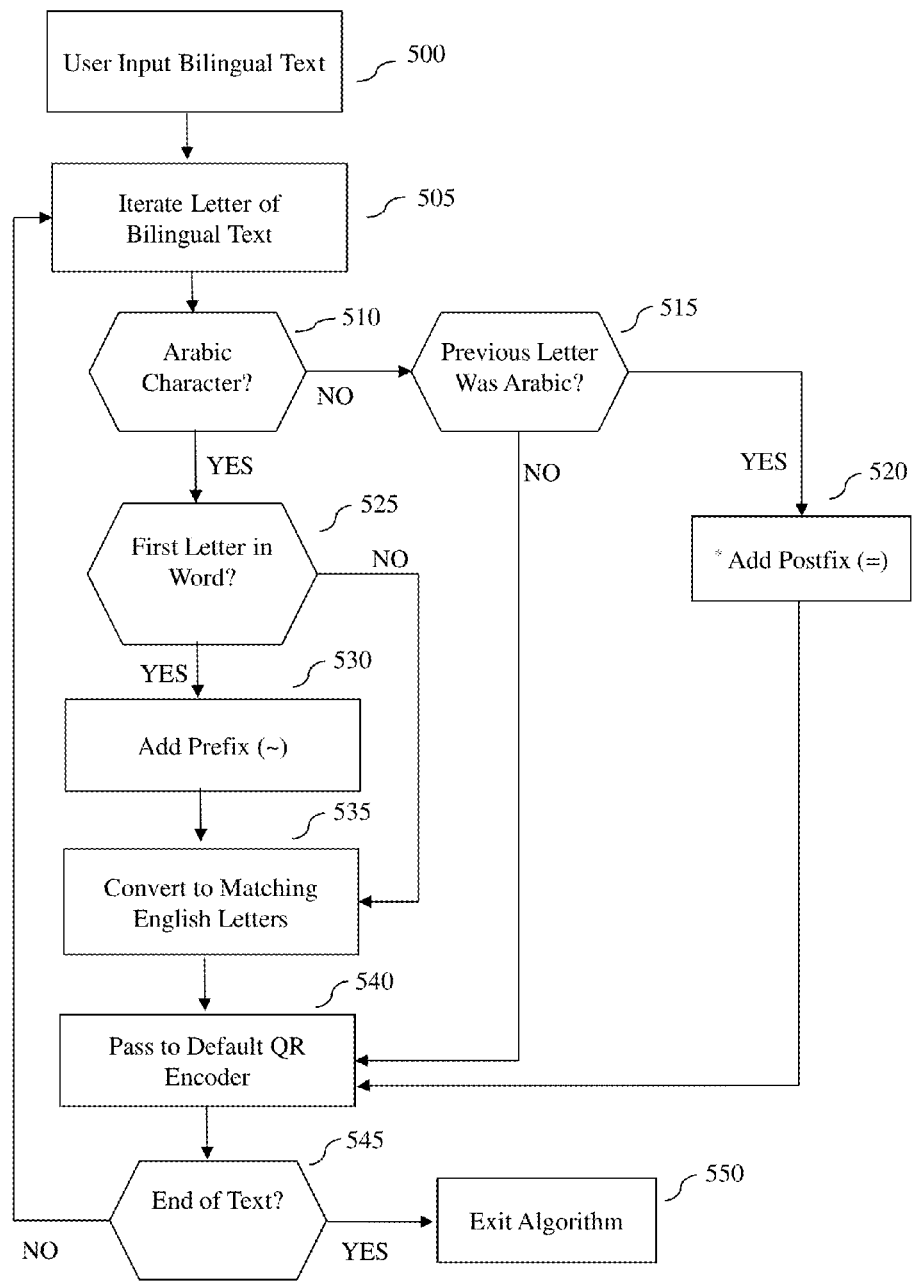
FIG. 7 shows a flow diagram implementing processes in accordance with aspects of the present invention.

FIGS. 5-7 show flow diagrams implementing aspects of the present invention. Each of the flow diagrams may equally represent a high-level block diagram or a swim-lane diagram of the invention. The steps of the flow diagram may be implemented and executed from either a server, in a client server relationship, or they may run on a user workstation with operative information conveyed to the user workstation as represented in FIG. 1.

Furthermore, the invention can take the form of a computer program product accessible from the computer-readable storage medium providing program code for use by or in connection with a computer or any instruction execution system. The software and/or computer program product can be implemented in the environment of FIG. 1. The computer-readable storage medium and computer program product are physical, tangible devices or other storage and are a non-transitory medium, e.g., not a signal per se.

FIG. 5 shows a flow diagram of bilingual text encoding in accordance with aspects of the present invention. At step 300, a bilingual text is input. As an example, the bilingual text may include Arabic and English, although embodiments are not limited to this example of a Latin-based language and a non Latin-based language. Accordingly, although the Arabic language is used herein, the use of non-Arabic and non Latin-based languages can equally be used with the processes described herein. At step 305, the bilingual text is passed through a bilingual text encoder algorithm. The encoder algorithm takes every Arabic character and converts the Arabic character to a matching English letter according to a lookup table (e.g., lookup table 200 in FIG. 3). The encoder algorithm leaves every English character unchanged. Further, the encoder algorithm adds a first padding (e.g., prefix character, ~) if the first letter in a word is Arabic and a second padding (e.g., postfix character, =) if the last letter in the word is Arabic. Therefore, if an Arabic word is input, the encoder algorithm would output a "~[matching English letters]=". The prefix and postfix characters help a decoding algorithm determine whether the word is Arabic. After the encoder algorithm iterates through every character of the bilingual text, an English text (i.e., encoded representation) is output at step 310. An example of the encoded representation (e.g., encoded representation 120) output by the encoder algorithm is shown in FIG. 2. Then, at step 315, the encoded representation is passed through a QR encoder to generate a QR based on the encoded text representation. The QR code is output from the QR encoder at step 320.

FIG. 6 shows a flow diagram of bilingual text decoding in accordance with aspects of the present invention. At step 400, a QR code is input. In embodiments, the QR code has been generated based on a bilingual text, although embodiments are not limited to the examples described herein. For example, the QR code can be generated based on only one language or more than two languages. At step 405, the QR code is decoded by a QR decoder, and an English text (i.e., encoded representation) is output at step 410. An example of the encoded representation (e.g., encoded representation 120) output by the QR decoder is shown in FIG. 2. Then, at step 415, the encoded representation is passed through a bilingual text decoder algorithm. The decoder algorithm takes every character of the encoded representation and converts each character of the encoded representation to a bilingual text according to a lookup table (e.g., lookup table 200 in FIG. 3). The bilingual text decoder algorithm leaves every character of the encoded representation which does not start with a prefix character (e.g., ~) unchanged. Further, the decoder algorithm converts every character after the first padding (e.g., prefix character, ~) to a corresponding Arabic character until the decoder algorithm finds the second padding (e.g., postfix character, =). Therefore, if a coding representation is input "~[matching English letters]=", the decoder converts the [matching English letters] to their corresponding Arabic letters. After the decoder algorithm iterates through every character of the encoded representation, a bilingual text is output from the decoder algorithm at step 420.

FIG. 7 shows a flow diagram implementing processes in accordance with aspects of the present invention. In particular, FIG. 7 shows a more detailed view of the encoding algorithm (e.g., encoder algorithm at step 305 in FIG. 5). At step 500, a user inputs bilingual text. However, embodiments are not limited. For example, a bilingual text may be machine generated, input by a hardware device, or generated by a software algorithm. At step 505, a letter of the bilingual text is iterated. Then, at step 510, it is determined whether the current letter is an Arabic letter. If the current letter is not an Arabic letter (i.e., step 510 is NO), then the previous letter is checked to determine whether the previous letter was an Arabic letter at step 515. If the previous letter was not an Arabic letter (i.e., step 515 is NO), then the letter is passed to default QR encoder at step 540. Alternatively, if the previous letter was Arabic (i.e., step 515 is YES), then a postfix character (e.g., =) is added to indicate the end of Arabic text/string and the current letter is passed to default QR encoder at step 540.

Moreover, if the current letter is an Arabic letter (i.e., step 510 is YES), then it is determined whether the current letter is a first letter in the word at step 525. If the current Arabic letter is not the first letter in the word (i.e., step 525 is NO), then the current Arabic letter is converted to a matching English letter at step 535 based on a lookup table (e.g., lookup table 200 in FIG. 3). Alternatively, if the current Arabic letter is the first letter in the word (i.e., step 525 is YES), then a prefix character (e.g., ~) is added at step 530 to indicate the start of Arabic text/string. Then, at step 535, the current Arabic letter is converted to the matching English letter based on a lookup table (e.g., lookup table 200 in FIG. 3). Finally, at step 540, the current letter is passed to default QR encoder.

In FIG. 7, at step 545, it is determined whether the current letter is the end of the bilingual text. If the current letter is the end of the bilingual text (step 545 is YES), then the algorithm is exited at step 550. Alternatively, if the current letter is not at the end of the bilingual text (step 545 is NO), then the flow returns to step 505, the letter is iterated to the next letter, and the process continues again as described above.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method implemented in a computer infrastructure having computer executable code tangibly embodied in a computer readable storage medium having programming instructions configured to:
   receive a bilingual text which comprises a first set of characters in a Latin-based language and a second set of characters in a non Latin-based language;
   convert the second set of characters in the non Latin-based language in the bilingual text to a third set of characters in the Latin-based language based on a lookup table;
   add a prefix character and a postfix character to each converted word in the third set of characters;
   output an encoded representation of the bilingual text which comprises the converted third set of characters, the added prefix character to each converted word in the third set of characters, the postfix character to each converted word in the third set of characters, and the first set of characters in the Latin-based language; and
   generate a QR code based on the encoded representation of the bilingual text,
   wherein the generation of the QR code based on the encoded representation of the bilingual text embeds a higher number of Arabic characters than a generation of the QR code for the same bilingual text based solely on a standard QR encoding scheme.

2. The method of claim 1, wherein the Latin-based language comprises English and the non Latin-based language comprises Arabic.

3. The method of claim 1, wherein the Latin-based language comprises one of English, French, German, and Italian.

4. The method of claim 1, wherein the non Latin-based language comprises one of Arabic, Urdu, and Farsi.

5. The method of claim 1, wherein the generation of the QR code based on the encoded representation of the bilingual text requires a smaller number of binary bits to represent the bilingual text than a generation of the QR code for the same bilingual text based solely on the standard QR encoding scheme.

6. The method of claim 1, wherein the lookup table comprises a mapping of the non Latin-based language to a corresponding Latin-based language.

7. The method of claim 1, wherein the prefix character is added immediately before each converted word in the third set of characters in the Latin-based language.

8. The method of claim 1, wherein the postfix character is added immediately after each converted word in the third set of characters in the Latin-based language.

9. A computer program product comprising a computer readable storage medium having program instructions embodied therewith, wherein the computer readable storage medium is not a transitory signal per se, and the program instructions are readable by a computing device to cause the computing device to perform a method comprising:
   receiving a QR code based on the encoded representation of the bilingual text;
   converting the QR code to the encoded representation of the bilingual text;
   receiving the encoded representation of a bilingual text which comprises a first set of characters in a Latin-based language and a second set of characters in a non Latin-based language;
   converting the encoded representation of the bilingual text to the first set of characters in the Latin-based language and the second set of characters in the non Latin-based language based on a lookup table;
   removing prefix characters and postfix characters after the conversion of the encoded representation; and
   outputting the bilingual text which comprises the first set of characters in the Latin-based language and the second set of characters in the non Latin-based language,
   wherein the received QR code based on the encoded representation of the bilingual text embeds a higher number of Arabic characters than the received QR code for the same bilingual text based solely on a standard QR encoding scheme.

10. The computer program product of claim 9, wherein the Latin-based language comprises English and the non Latin-based language comprises Arabic.

11. The computer program product of claim 9, wherein the Latin-based language comprises one of English, French, German, and Italian.

12. The computer program product of claim 9, wherein the non Latin-based language comprises one of Arabic, Urdu, and Farsi.

13. The computer program product of claim 9, wherein the lookup table comprises a mapping of the non Latin-based language to a corresponding Latin-based language.

14. The computer program product of claim 9, further comprising:

outputting the encoded representation of the bilingual text.

15. A computer system for providing encoding of a multi-lingual text, the system comprising:
a CPU, a computer readable memory, and a computer readable storage media;
first program instructions to receive the multi-lingual text which comprises a first set of characters in a Latin-based language and a second set of characters in a non Latin-based language; and
second program instructions to iterate through each letter of the multi-lingual text and perform further program instructions comprising:
third program instructions to determine that a current letter of the multi-lingual text is the Latin-based language and a previous letter of the multi-lingual text is the non Latin-based language, and then add a postfix character to the previous letter of the multi-lingual text in response to the determination, which indicates an end of a non Latin-based language string;
fourth program instructions to determine that the current letter of the multi-lingual text is the non Latin-based language and is a first letter in a word, and then add a prefix character in front of the current letter of the multi-lingual text in response to the determination to indicate a start of the non Latin-based language string; and
fifth program instructions to convert the current letter of the multi-lingual text to a corresponding Latin-based language based on a lookup table,
wherein the first, second, third, fourth, and fifth program instructions are stored on the computer readable storage media for execution by the CPU via the computer readable memory, and
the postfix character is different from the prefix character.

16. The computer system of claim 15, wherein the lookup table comprises a mapping of the non Latin-based language to the corresponding Latin-based language.

17. The computer system of claim 15, wherein the non Latin-based language comprises one of Arabic, Urdu, and Farsi.

18. The computer system of claim 15, wherein the Latin-based language comprises English and the non Latin-based language comprises Arabic.

19. The method of claim 1, wherein the postfix character is different from the prefix character.

20. The method of claim 6, wherein the mapping of the non Latin-based language to the corresponding Latin-based language further comprises a matching Latin-based character for each non Latin-based character.

* * * * *